(12) United States Patent
Davies

(10) Patent No.: US 12,215,762 B2
(45) Date of Patent: Feb. 4, 2025

(54) RADIAL BEARING SYSTEM FOR BALL NUT AND SCREW ASSEMBLY

(71) Applicant: Goodrich Actuation Systems Limited, West Midlands (GB)

(72) Inventor: Stephen Harlow Davies, Shrewsbury (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days.

(21) Appl. No.: 18/347,232

(22) Filed: Jul. 5, 2023

(65) Prior Publication Data

US 2024/0019018 A1    Jan. 18, 2024

(30) Foreign Application Priority Data

Jul. 13, 2022 (EP) ................................. 22275096

(51) Int. Cl.
*F16H 25/22*    (2006.01)
(52) U.S. Cl.
CPC ............................... *F16H 25/2204* (2013.01)
(58) Field of Classification Search
CPC ................... F16H 25/2204; F16H 25/2223
See application file for complete search history.

(56) References Cited

U.S. PATENT DOCUMENTS

| | | | |
|---|---|---|---|
| 3,046,808 A * | 7/1962 | Le De Mart | ........ F16H 25/2204 74/424.7 |
| 4,644,811 A * | 2/1987 | Tervo | .................. F16H 25/2015 74/412 TA |
| 5,467,662 A | 11/1995 | Lange et al. | |
| 8,950,282 B2 | 2/2015 | Babinski | |
| 8,960,037 B2 | 2/2015 | Yamanaka | |
| 2020/0124146 A1 | 4/2020 | Zinnecker | |

FOREIGN PATENT DOCUMENTS

| | | |
|---|---|---|
| EP | 3540264 A1 | 9/2019 |
| JP | H11241755 A | 9/1999 |
| JP | 2007285480 A | 11/2007 |

OTHER PUBLICATIONS

Abstract for JPH11241755 (A); Published Sep. 7, 1999, 1 page.
European Search Report for Application No. 22275096.0, mailed Dec. 6, 2022, 7 pages.
Patent Abstracts of Japan for JP2007285480A, published on Jan. 11, 2007, 1 page.

* cited by examiner

*Primary Examiner* — Jake Cook
(74) *Attorney, Agent, or Firm* — CANTOR COLBURN LLP

(57) ABSTRACT

A ball nut and screw assembly includes a screw, and a nut received on the screw. A first raceway having a helical portion is defined between a convex groove of the screw and a concave groove of the nut. The first raceway has adjacent concave grooves to provide said helical portion. A first plurality of balls are in said first raceway, and a first radial outboard raceway is provided at a first end of the first raceway and a second radial outboard raceway provided at a second end of said first raceway. The first and second outboard radial raceways are formed between a concave groove formed in a first outboard component and the outermost, external surface of the screw that is in a position between said adjacent grooves of said screw and at least a first bearing ball is provided in said first radial outboard raceway.

10 Claims, 7 Drawing Sheets

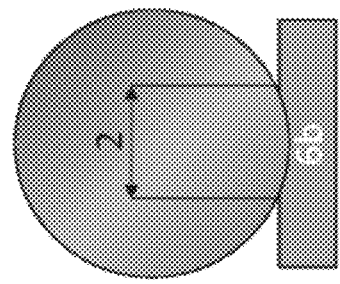
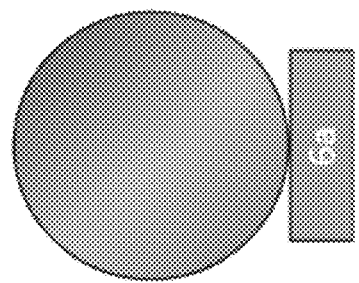
Figure 6

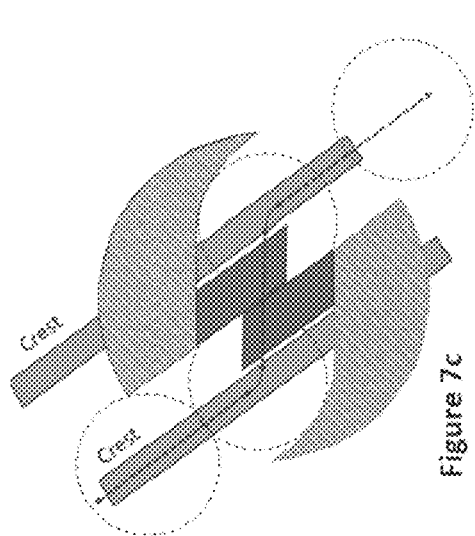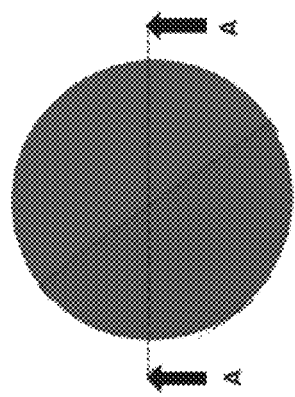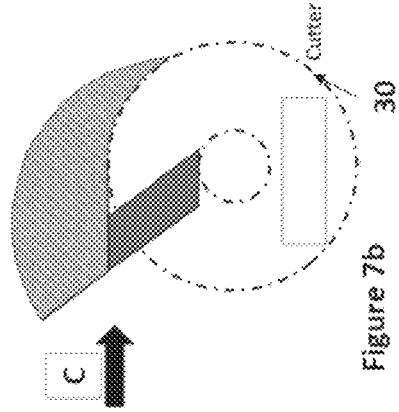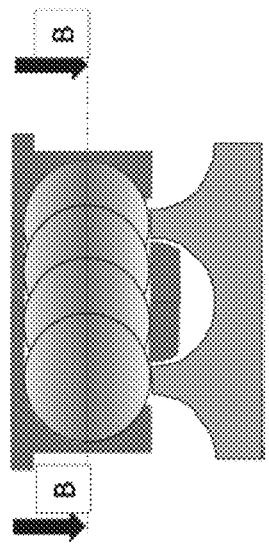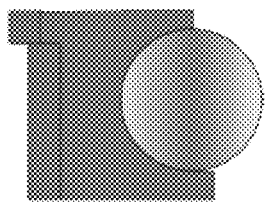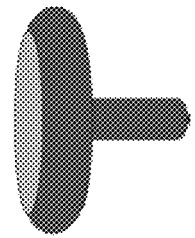

RADIAL BEARING SYSTEM FOR BALL NUT AND SCREW ASSEMBLY

CROSS REFERENCE TO RELATED APPLICATION

This application claims priority to European Patent Application No. 22275096.0 filed Jul. 13, 2022, the entire contents of which is incorporated herein by reference.

TECHNICAL FIELD

The disclosure relates to ballscrew assemblies.

BACKGROUND

Conventional ball nut and screw assemblies have a helical raceway and balls received therein. The balls react load through the centerline of the assembly.

SUMMARY

A ball nut and screw assembly is described herein that includes a screw, and a nut received on the screw. A first raceway having a helical portion is defined between a convex groove of the screw and a concave groove of the nut. The first raceway having adjacent grooves to provide said helical portion, a first plurality of balls provided in said first raceway, and further comprising a first radial outboard raceway provided at a first end of said first raceway and a second radial outboard raceway provided at a second end of said first raceway, and wherein said first and second outboard radial raceways are formed between a concave groove formed in a first outboard component and the outermost, external surface of the screw that is in a position between said adjacent grooves of said screw and at least a first bearing ball provided in said first radial outboard raceway and at least a second bearing ball provided in said second radial outboard raceway.

In some examples, the ball nut and screw assembly of claim 1 wherein said external surface of the screw that provides said first radial outboard raceway may be straight.

In some examples the external surface of the screw that provides said first radial outboard raceway may be concave.

In some examples, the external surface of the screw that provides said second radial outboard raceway may be straight.

In some examples the external surface of the screw that provides said second radial outboard raceway may be concave.

In some examples, the first plurality of balls may have the same diameter as said first and second bearing balls.

In some examples said first outboard component may be provided so as to be independent from said nut.

In some examples, said first outboard component may be provided so as to be integrally formed with said nut.

In some examples second outboard component may be provided so as to be independent from said nut.

In some examples said second outboard component may be provided so as to be integrally formed with said nut.

A method of manufacturing a ball nut and screw assembly is also described herein comprising providing a screw internally into a nut such that said nut is received on the screw, forming a first raceway having a helical portion by forming a concave groove in the external surface of the screw and a concave groove in the internal surface of the nut such that said first raceway is formed between said concave grooves of said nut and screw and such that adjacent concave grooves of both of said nut and screw provide said helical portion, providing a first plurality of balls in said first raceway, and said method further comprising providing a first radial outboard raceway at a first end of said first raceway and a second radial outboard raceway at a second end of said first raceway, and forming said first and second outboard radial raceways between a concave groove formed in a first outboard component and the outermost, external surface of the screw that is in a position between said adjacent grooves of said screw and providing at least a first bearing ball in said first radial outboard raceway and at least a second bearing ball in said second radial outboard raceway.

The method may further comprise forming said external surface of the screw that forms said first radial outboard raceway such that it is straight.

The method may further comprise forming said external surface of the screw that provides said first radial outboard raceway such that it is concave.

The method may further comprise forming said external surface of the screw that provides said second radial outboard raceway such that it is straight.

The method may further comprise forming said external surface of the screw that provides said second radial outboard raceway such that it is concave.

The method may further comprise forming said first and/or second outboard component integrally with said nut.

The method may further comprise forming said first and/or second outboard component independently from said nut.

BRIEF DESCRIPTION OF DRAWINGS

The following descriptions should not be considered limiting in any way. With reference to the accompanying drawings in which:

FIG. 6 depicts a comparison of a straight and concave raceway; and

FIGS. 7a to 7f depict the geometry of a ball return suitable for use with additional ball screw channels of FIG. 3.

DETAILED DESCRIPTION

Figure 1:
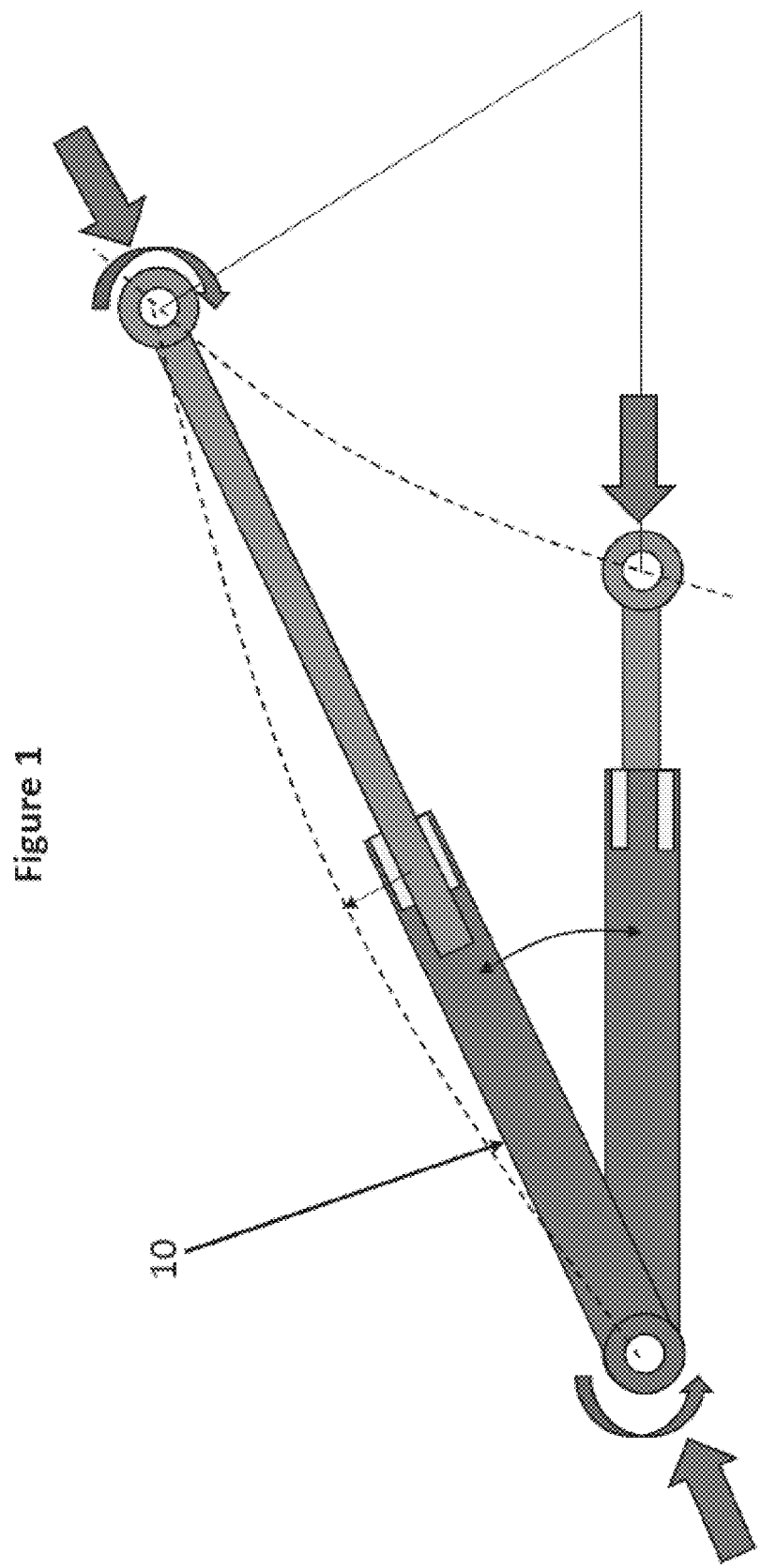
FIG. 1 depicts an actuator as it extends and contracts.

Actuators 10, such as Door Opening System (DOS), Powered Door Opening System (PDOS) and spoiler actuators often articulate through their operational cycle. As can be seen in FIG. 1, as the actuator 10 extends and articulates, the actuator will attempt to bend (as shown with a dashed line in FIG. 1) due to the bending moment induced from mounting bearing frictions.

Figure 2:
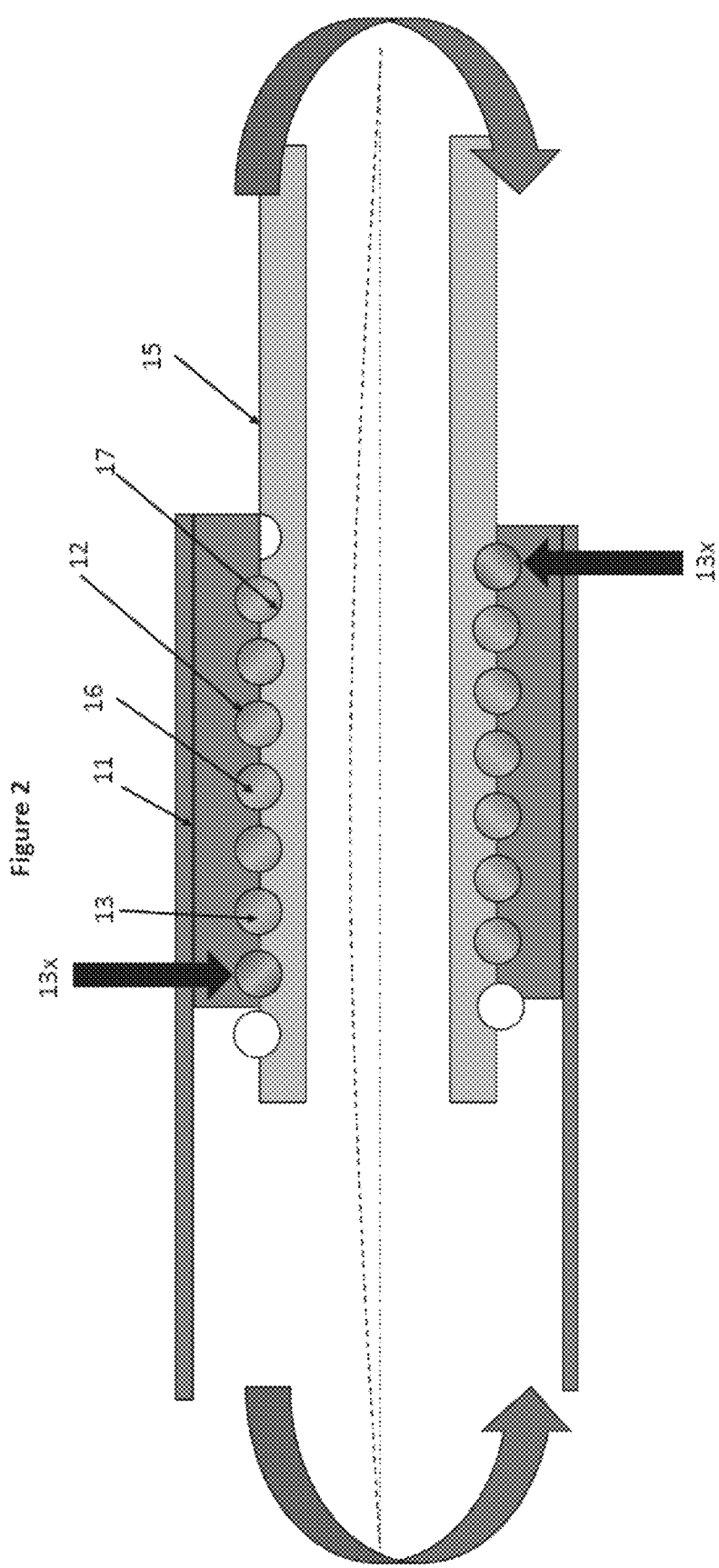
FIG. 2 depicts a known ball screw assembly that may be used in an actuator.

FIG. 2 depicts a known ball nut and screw assembly that may be used in such an actuator. Conventional ball nut and screw assemblies are usually designed with a helical ball raceway formed by mating helical grooves which contact the balls to react load axially. That is, the ball nut and screw assembly comprises a nut 11 that has concave grooves 12 provided on its internal surface. Provided internally to the nut 11 is a screw 15 which has an outer diameter and a threaded outer surface formed by corresponding helical concave grooves 17 being provided on its external surface. The helical internal groove of the nut 11 is radially aligned with the external grooves of the screw 15, such that the corresponding grooves 12, 17 of the nut 11 and the screw 15 create a first raceway 16 comprising channels in which a plurality of axial load balls 13 are received and positioned. The first plurality of balls 13 are designed for axial loads only and any bending moments reacted by the balls 13 will induce radial loads across the first raceway 16, reducing life and eventually seizing up the ballscrew motion.

As can be seen in this figure, as the actuator 10 extends, and the screw rotates relative to the nut 11, the outermost rows of balls 13x, i.e. those closest to the ends of the nut 11, will be subjected to the highest radial loads resulting from the induced bending moments due to bearing frictions loads. That is, the outermost rows of balls 13x are excessively loaded. This is a known root cause of ballscrew wear out.

Figure 3:
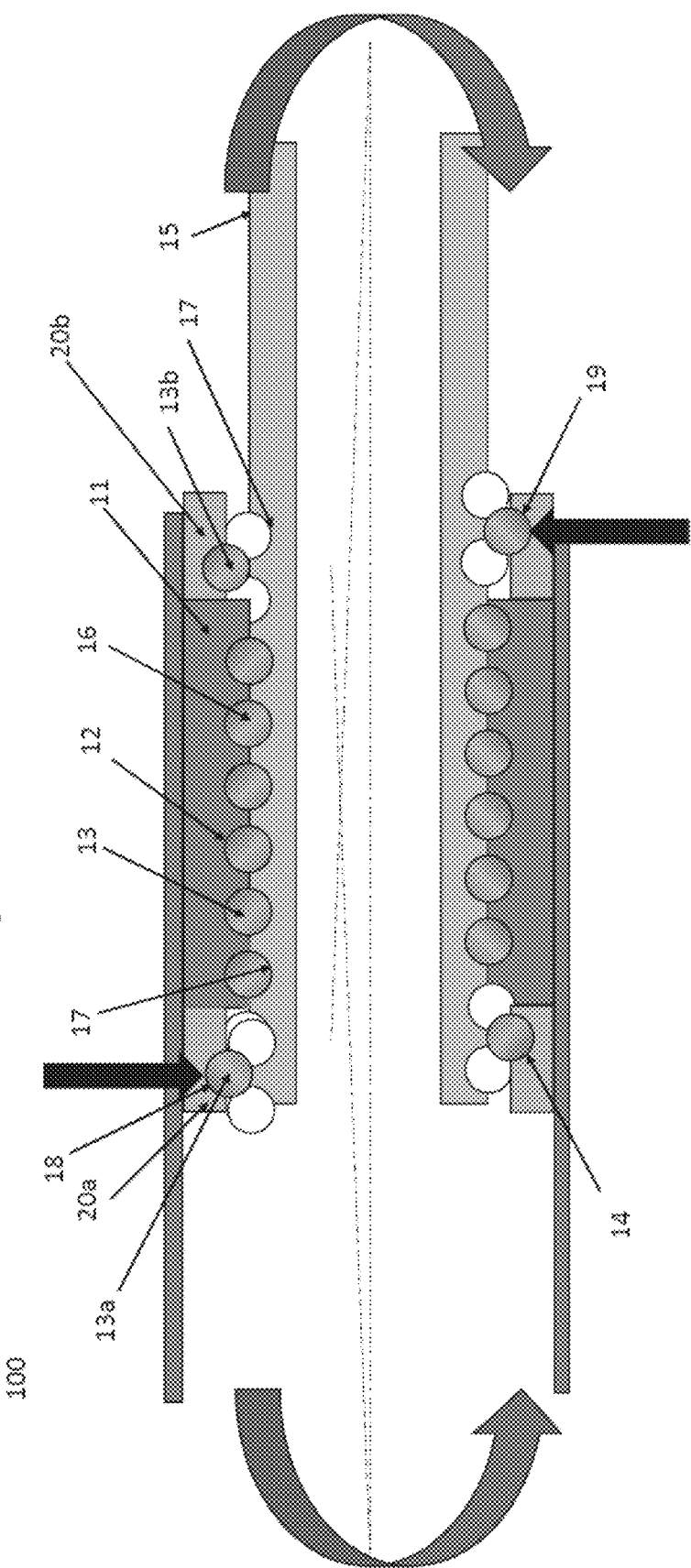
FIG. 3 depicts a new type of ball screw assembly that may be used in an actuator.

FIG. 3 depicts a new type of ball nut and screw assembly 100 that may be used in an actuator that articulates and that is capable of reacting motion induced bending moments. Similarly to that described above with reference to FIGS. 2, as can be seen in this figure, the ball nut and screw assembly 100 comprises a screw 15 and a nut 11 received on the screw 15. Similar to that shown in FIG. 2, the nut 11 has concave grooves 12 provided on its internal surface, and the screw 15 has concave grooves 17, which, as described with reference to FIG. 2, together provide a first raceway 16 for receiving a first plurality of balls 13. These corresponding grooves provide a first raceway 16 having a helical portion defined between the screw 15 and the nut 11. A first plurality of balls 13 cooperatively effect relative translation of the nut 11 and screw 15 on relative rotation thereof. Axial loading of the nut 11 and screw is taken through the first plurality of balls 13 provided in the first raceway 16.

This assembly differs from that shown in FIG. 2, however, in that the assembly further comprises two additional raceways, i.e. first and second recirculating outboard radial raceways 18, 19 provided at either side of the first raceway 16 and at either side of the nut 11. These additional raceways 18, 19 are formed by providing a first outboard component 20a at one side of the nut 11 and a second outboard component 20b at the opposite side of the nut 11. Each of the first and second outboard components 20a, b have at least one additional concave groove 14, formed in the internal surface of the component 20a for receiving a second 13a and third ball 13c or plurality of balls, respectively.

A difference between the first and second recirculating outboard radial raceways 18, 19 and the conventional, first raceway, 16 however, is that the first and second outboard radial raceways 18, 19 are not formed so that the ball contacts the internal surface of both of the corresponding concave channels in the outboard components 20a, b and screw 15, but instead these raceways 18, 19 are formed by a concave groove in the first and second outboard components 20a, b and the outermost, external surface of screw 15 that is between the helical grooves of the screw 15.

These first and second outboard components 20, b and first and second recirculating raceways 18, 19 may be configured to receive a second 13a and third ball 13c respectively, such that the balls 13a, 13b runs within the groove 14 and between the inner surface of the concave channel 14 and the outside diameter of the screw 15. That is, the balls 13a, 13b contact the outer surface of the screw 15 in a position that is between the conventional concave helical grooves of the thread of the screw 15. These new channels 14 serve to react radial loads induced by any bending moments applied across the ballnut 11. These two raceways 18, 19 that are provided externally to the nut 11 only react to radial loading and are functionally independent to the conventional raceway 16 formed in the ball nut 11 that generate the axial force function. Due to this, the conventional ball nut channels of the first raceway 16 are fully protected from the bending moments applied on the ball nut and screw assembly when the actuator extends and contracts. This design protects the conventional ball nut rows from negative effects caused by bending moments on the actuator.

Figure 4:
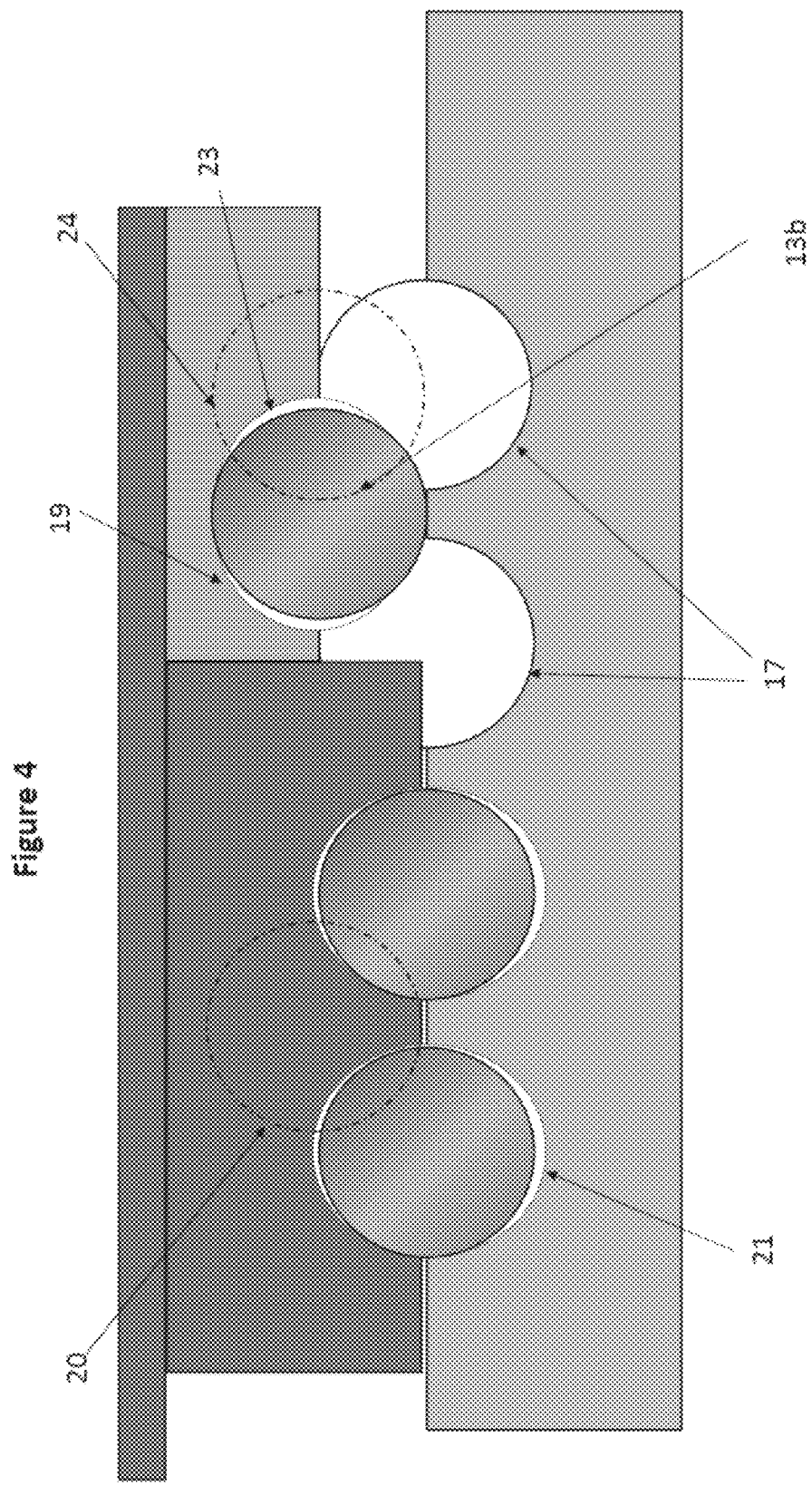
FIG. 4 depicts a closer view of the additional ball screw channels of FIG. 3.

FIG. 4 depicts a closer view of the first, conventional raceway 16 and the second outboard recirculating raceway 19 of FIG. 3. As can be seen in this figure, the new additional radial raceways 18, 19 are formed such that the balls 13a, 13b contact the raceway in a position that is between the conventional grooves 17 of the screw 15 and concave grooves 14 provided on the internal surface of the external component 20a, b. The balls 13a, b may have the same diameter as those used in the conventional channels 17. The outboard radial component 20a, b may be independent or integrated with the conventional nut 11 body. The extremity of the ball 13 locus in a recirculating flip over action 20 is shown in this figure. The effective backlash in the radial direction is also shown at 21 in this figure. That is, the backlash is defined to ensure that the outermost rows engage radially. The effective backlash of the bearing row 13a, b in the axial direction is shown at 23 in this figure, and the extremity of the ball locus 13a, b in the transfer shell, or component 20a,b is shown at 24 in FIG. 4.

Figure 5:
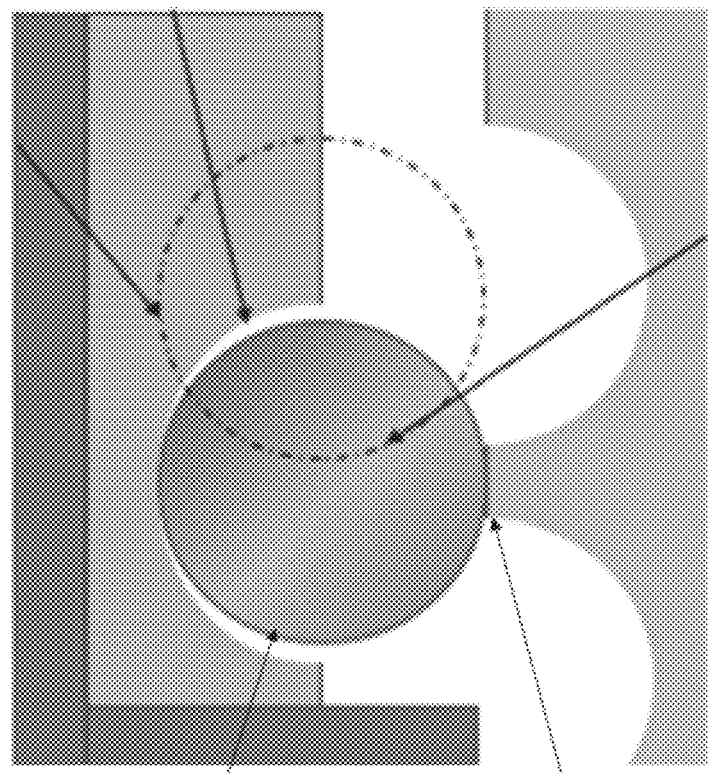
FIG. 5 depicts a closer view of the additional ball screw channels of FIG. 3.

FIG. 5 depicts the first recirculating radial raceway 18 and further depicts how the outside surface and diameter of the screw that forms a surface of the raceway 18 can be straight or convex with a conformity ratio dependent upon a magnitude of a derived radial loads. The balls 13a, b can be the same diameter as those used in the conventional raceway 16. The recirculating radial raceways 18, 19 of the bearing rows may be independent or integrated with the conventional nut body 11. The outer diameter of the screw 15 can be straight or convex with a conformity ratio dependent upon the magnitude of the derived typical loading. The width of a convex raceway may typically be 25-40% of the ball diameter (e.g. 5 mm ball, 1.25 l loading.

FIG. 6 depicts a first and second example of the shape of the first and second recirculating radial raceways 18, 19 of the bearing rows, defined on the external surface of the screw 15 which are in contact with the balls 13a, 13b. In the first example 6a, the surface of the screw that forms the raceway 18, 19 is straight. In the second example 6b, the surface of the screw that forms the raceway 18, 19 is convex.

Table 1 below provides the dimensions used in the feasibility study of these two shapes of raceways.

TABLE 1

| | |
|---|---:|
| Extended Actuator length | 1500 mm |
| Compressive load | 10000N |
| Bearing Friction Mu | 0.15 |
| Bearing radii (each end) | 12.7 mm |
| Span between Ball Nut Bearing Rows | 70 mm |
| Screw OD | 30 mm |
| Ball OD | 5 mm |

Table 2 below shows the resulting stresses when the different raceways 6a, b were compared.

As can be seen in table 2 below, with a convex 6b raceway and for a given magnitude of bending moment, the induced compressive stress are significantly reduced.

| Ball track type | Segment angle of bearing balls | No. of ball bearing rows | Compressive stress MpA | Compressive stress ksi |
|---|---|---|---|---|
| Straight - 6a | 90 | 1 | 2969 | 430 |
| Convex - 6b | 90 | 1 | 1324 | 192 |

FIGS. 7a to *f* illustrate the geometry of a ball return that may be inserted into the external outboard radial component 20a,b to complete the ball circuit. Other ball return designs may be used to facilitate the complete ball circuits associated with additional components 20a,b.

FIG. 7a depicts the transfer shell, with a view on the half slot. FIG. 7b depicts a section B-B (see FIG. 7e) of the half transfer shell, with the track cutter 30 shown in dashed lines. FIG. 7c depicts a cross section along the line B-B for the full shell. FIG. 7d depicts a track cutter 30. FIG. 7a depicts a cross-section taken along the line A-A (see FIG. 70. FIG. 7f depicts a top view of the transfer shell.

This ballscrew design enables a ballscrew that is tolerant of both derived bending moments typical of articulating actuators (Fan Cowl Actuators, Spoilers) and other actuators subject to radial loading induced by vibration and high speed lateral airflow. The conventional ball rows are fully protected and are sized assuming pure axial loading. This ballscrew design enables unique design space for articulating ballscrew EMA configurations, resulting in predictable life under new load regimes.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

The invention claimed is:

1. A ball nut and screw assembly comprising:
   a screw;
   a nut received on the screw;
   a first raceway having a helical portion defined between a convex groove of the screw and a concave groove of the nut; said first raceway having adjacent concave grooves to provide said helical portion;
   a first plurality of balls provided in said first raceway; and
   a first radial outboard raceway provided at a first end of said first raceway and a second radial outboard raceway provided at a second end of said first raceway, and wherein said first outboard radial raceway is formed between a first concave groove formed in a first outboard component and the outermost, external surface of the screw that is in a position between said adjacent grooves of said screw and the second outboard radial raceway is formed between a second concave groove formed in a second outboard component and the outermost, external surface of the screw;
   at least a first bearing ball provided in said first radial outboard raceway and at least a second bearing ball provided in said second radial outboard raceway;
   wherein said external surface of the screw that provides said first radial outboard raceway is concave.

2. The ball nut and screw assembly of claim 1, wherein said external surface of the screw that provides said second radial outboard raceway is concave.

3. The ball nut and screw assembly of claim 1, wherein said first plurality of balls have the same diameter as said first and second bearing balls.

4. The ball nut and screw assembly of claim 1, wherein said first outboard component is provided so as to be independent from said nut.

5. The ball nut and screw assembly of claim 1, wherein said first outboard component is provided so as to be integrally formed with said nut.

6. The ball nut and screw assembly of claim 1, wherein said second outboard component is provided so as to be independent from said nut.

7. The ball nut and screw assembly of claim 1, wherein said second outboard component is provided so as to be integrally formed with said nut.

8. A method of manufacturing a ball nut and screw assembly comprising:
   providing a screw internally into a nut such that said nut is received on the screw;
   forming a first raceway having a helical portion by forming a concave groove in the external surface of the screw and a concave groove in the internal surface of the nut such that said first raceway is formed between said concave grooves of said nut and screw and such that adjacent concave grooves of both of said nut and screw provide said helical portion;
   providing a first plurality of balls in said first raceway, and said method further comprising providing a first radial outboard raceway at a first end of said first raceway and a second radial outboard raceway at a second end of said first raceway;
   forming said first radial raceway between a concave groove formed in a first outboard component and the outermost, external surface of the screw that is in a position between said adjacent grooves of said screw;
   forming said second outboard radial raceway between a concave groove formed in a second outboard component and the outermost, external surface of the screw that is in a position between said adjacent grooves of said screw;
   providing at least a first bearing ball in said first radial outboard raceway and at least a second bearing ball in said second radial outboard raceway; and
   forming said external surface of the screw that provides said second radial outboard raceway such that it is concave.

9. The method of claim 8, further comprising:
forming said external surface of the screw that provides said first radial outboard raceway such that it is concave.
10. The method of claim 8, further comprising:
forming said external surface of the screw that provides said second radial outboard raceway such that it is straight.

* * * * *